(12) United States Patent
Shen

(10) Patent No.: US 8,823,448 B1
(45) Date of Patent: Sep. 2, 2014

(54) FEED FORWARD ACTIVE EMI FILTERS

(71) Applicant: Hamilton Sundstrand Corporation, Charlotte, NC (US)

(72) Inventor: Miaosen Shen, Charlotte, NC (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 13/853,229

(22) Filed: Mar. 29, 2013

(51) Int. Cl.
*H03B 1/00* (2006.01)
*H04B 15/00* (2006.01)

(52) U.S. Cl.
CPC ...................................... *H04B 15/00* (2013.01)
USPC .......................................................... 327/552

(58) Field of Classification Search
USPC ........................... 327/551, 552, 556, 559, 561
See application file for complete search history.

(56) References Cited

U.S. PATENT DOCUMENTS

| 7,266,062 B2* | 9/2007 | Kurihara | 369/47.44 |
| 7,583,136 B2* | 9/2009 | Pelly | 327/551 |
| 7,944,326 B2* | 5/2011 | Tucker | 333/181 |

OTHER PUBLICATIONS

L. Xing et al., "Optimal Damping of EMI Filter Input Impedance," IEEE Trans. Ind. Appl., vol. 47, No. 3, pp. 1432-1440, May/Jun. 2011.
M. L. Heldwein et al., "Implementation of a Transformerless Common-Mode Active Filter for Offline Converter Systems," IEEE Trans. Ind. Appl., vol. 57, No. 5, pp. 1772-1786, May 2010.

* cited by examiner

*Primary Examiner* — Jeffrey Zweizig
(74) *Attorney, Agent, or Firm* — Edwards Wildman Palmer LLP; Joshua L. Jones; Adam P. Daniels

(57) ABSTRACT

An apparatus for active feed forward electromagnetic interference (EMI) filtering, including, a noise detection circuit that receives EMI noise occurring at a noise source, and an active feed forward circuit operatively coupled to the noise detection circuit. The active feed forward circuit generates a noise canceling signal based on the EMI noise received by the noise detection circuit. The apparatus further includes a filter operatively coupled to the active feed forward circuit and the noise source, the filter adapted to receive the EMI noise occurring at the noise source and the noise canceling signal from active feed forward circuit, wherein the filter cancels the received EMI noise based on the received noise canceling signal to reduce EMI noise at a load.

11 Claims, 3 Drawing Sheets

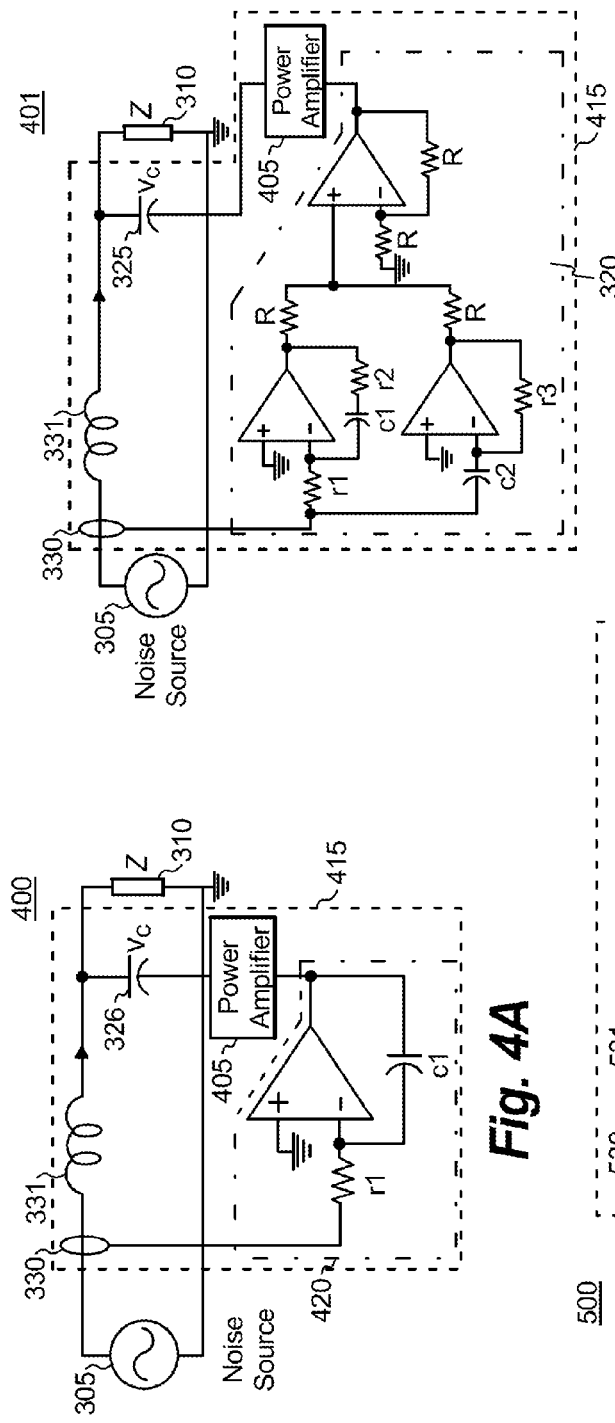
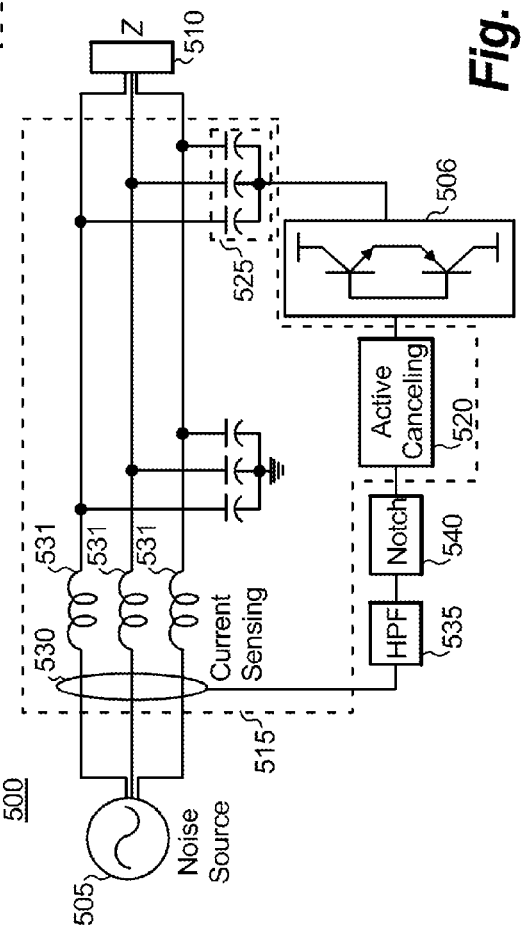
Fig. 4B
Fig. 4A
Fig. 5A

FEED FORWARD ACTIVE EMI FILTERS

BACKGROUND OF THE INVENTION

1. Field of the Invention

The present invention relates to electromagnetic interference (EMI) attenuation in power conversion systems, and particularly to common-mode EMI attenuation for three-phase inverter based motor drive applications.

2. Description of Related Art

Conventional power inverters such as three phase inverters are widely used in various industrial applications that include, for example, motor drive, power grid, uninterruptible power supplies, etc. At the heart of these conventional inverters is a semiconductor device (e.g., a metal-oxide semiconductor field-effect transistor (MOSFET), an Insulated Gate Bipolar Transistor (IGBT), and the like). Typically, these semiconductor devices operate in a high speed switching mode at a certain frequencies, e.g., pulse-width modulation (PWM). High-speed switching of such semiconductor devices can improve power quality for the overall inverter and a size reduction of its respective input and output filter. However, the high speed switching of the semiconductor device can create electromagnetic interference (EMI), which can deteriorate equipment performance near the inverter. Consequently, industry standards impose strict EMI standards or restrictions for the application PWM controlled inverters and thus, EMI attenuation has become a limiting factor for the design of power inverters. Accordingly, there is still a need in the art for improved EMI filters and improved EMI filtering techniques. The present invention provides a solution for these problems.

SUMMARY OF THE INVENTION

The subject invention is directed to new and useful electromagnetic interference (EMI) filter that attenuates EMI noise. In one exemplary embodiment, an active feed forward apparatus includes a noise detection circuit that receives EMI noise from a noise source, and an active feed forward circuit operatively coupled to the noise detection circuit. The active feed forward circuit generates a noise canceling signal based on the EMI noise received by the noise detection circuit. The apparatus further includes a filter operatively coupled to the active feed forward circuit and the noise source. The filter is adapted to receive the EMI noise from the noise source and generate the noise canceling signal by the active feed forward circuit. The filter cancels the received EMI noise based on the received noise signal to reduce EMI noise at a load.

In some embodiments, the filter can include a capacitor that receives the EMI noise from the noise source at a first terminal, and feeds the noise canceling signal from active feed forward circuit at a second terminal opposed to the first terminal. In these embodiments, the capacitor maintains a substantially steady voltage (e.g., zero) to attenuate the received EMI noise received at the first terminal based on the received noise canceling signal at the second terminal. The filter can optionally include an inductor operatively coupled in series between the noise source and the load. The capacitor can be operatively coupled in parallel with the noise source and the load, and in series with the active feed forward sensor.

In other embodiments, the filter can be designated as a primary filter and the apparatus can include additional filters such as a high pass filter and/or a notch filter that substantially prevent the primary filter (e.g., the capacitor) from receiving additional signal noise outside an EMI band of noise (e.g., from about 150 kHz-30 MHz) from the noise source.

In certain embodiments, the apparatus can include an amplifier operatively coupled between the active feed forward sensor and the filter. The amplifier operates to increase the noise canceling signal generated by the active feed forward sensor to yield an amplified noise canceling signal so the noise canceling signal received by the filter is amplified.

The invention also provides a method for active electromagnetic interference (EMI) filtering. The method includes determining, via a noise detection circuit, EMI noise from a noise source, and generating, via an active feed forward sensor operatively coupled to the noise detection circuit, a noise canceling signal based on the EMI noise determined by the noise detection circuit. The method can also include steps for receiving, via a filter operatively coupled to the active feed forward sensor and the noise source, the EMI noise from the noise source and the noise canceling signal from active feed forward sensor, and canceling, via the filter, the received EMI noise based on the received noise canceling signal to reduce EMI noise at a load. In such embodiments, the method can also include steps for amplifying the noise canceling signal to yield an amplified noise canceling signal. It is also contemplated that the steps for receiving the noise canceling signal can further include receiving the amplified noise canceling signal, and canceling the received EMI noise based on the received noise canceling signal.

With respect to canceling the received EMI noise based on the received noise canceling signal, the method can include steps for receiving the EMI noise from the noise source at a first terminal of a filter capacitor and receiving the noise canceling signal at a second terminal opposed to the first terminal of the filter capacitor. Canceling the received EMI noise can include steps for maintaining a substantially steady voltage at the filter capacitor to attenuate the received EMI noise received at the first terminal based on the received noise canceling signal at the second terminal. In certain embodiments, the method can include additional steps for filtering low frequency noise outside an EMI noise frequency, via at least one high pass filter, prior to canceling the received EMI noise.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1 is a circuit diagram of a noise source connected to a load, showing an electromagnetic interference (EMI) filter disposed there-between;

FIG. 4A is a circuit diagram of one embodiment of the active feed forward sensor, showing an ideal filter capacitor implementation;

FIG. 4B is a circuit diagram of another embodiment of the active feed forward sensor, implementing a non-ideal filter capacitor;

FIG. 5A-5B are circuit diagrams of the active feed forward sensor, showing a three phase noise source.

DETAILED DESCRIPTION OF THE PREFERRED EMBODIMENTS

Figure 3:
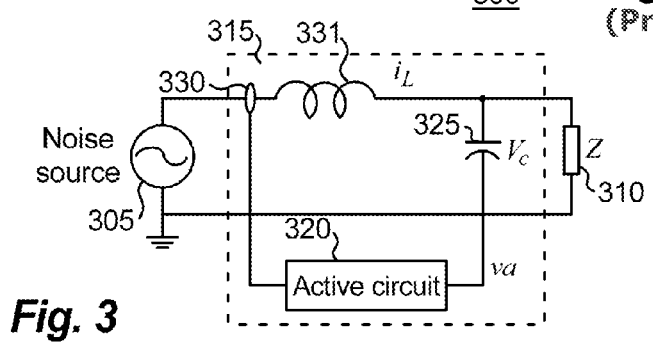
FIG. 3 is a circuit diagram a noise source connected to a load in accordance with the present invention, showing an active feed forward EMI sensor.

Reference will now be made to the drawings wherein like reference numerals identify similar structural features or aspects of the subject invention. For purposes of explanation and illustration, and not limitation, a partial view of an exemplary embodiment of the active feed forward EMI sensor in accordance with the invention is shown in FIG. 3 and is designated generally by reference character 315. Other embodiments of active feed forward EMI sensors in accordance with the invention, or aspects thereof, are provided in FIGS. 4-6, as will be described. The systems and methods of the invention can be used to sense or determine EMI noise from a noise source and attenuate such EMI noise at a point before or prior to reaching a load.

Figure 1:
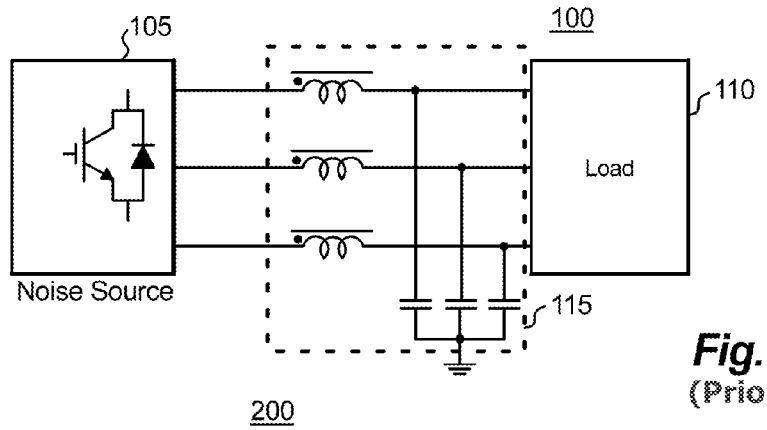

However, prior to discussing FIG. 3 and the active feed forward EMI sensor shown therein, discussion will first be directed toward FIGS. 1-2. As discussed above, electromagnetic interference (EMI) attenuation has become a limiting factor for power inverter design. In typical motor drive class A applications, common-mode EMI noise is categorized into conducted type in 150 kHz-30 MHz and radiated type beyond 30 MHz. Notably, most EMI attenuation is directed toward conducted type EMI noise can be attenuated using EMI filters.

With reference to FIG. 1, there is shown a circuit diagram (e.g., circuit 100) including a noise source 105 connected to a load 110 having an EMI filter disposed there-between. In particular, noise source 105 can be an alternating current (AC) noise source connected to load 110, which can include a passive load, an electric motor, etc. A passive EMI filter 115 is operatively coupled to noise source 105 and load 110 and disposed there-between. As shown, EMI filter 115 is a passive filter that employs a common-mode choke (inductor (L)) and a capacitor (C) to form a low-pass L-C filter.

Figure 2A:
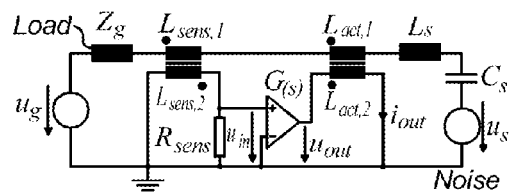
FIGS. 2A-2D are circuit diagrams of various exemplary active EMI filtering techniques.
Figure 2B:
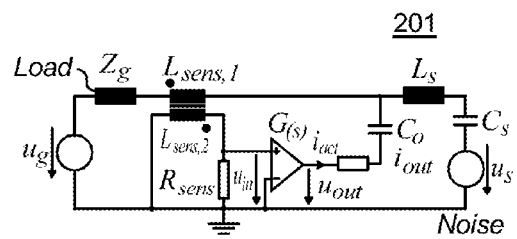
Figure 2C:
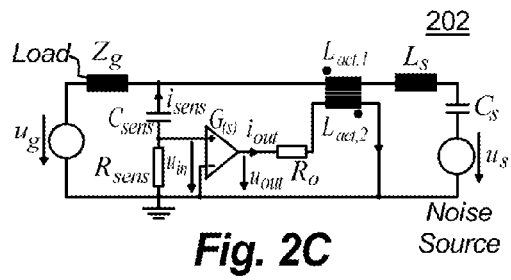
Figure 2D:
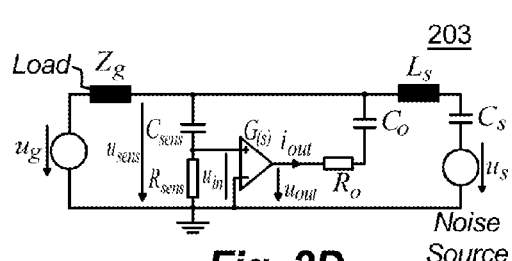

In contrast to passive EMI filters such as those shown in FIG. 1, active EMI filtering techniques can also be employed to attenuate EMI noise. For example, FIGS. 2A-2D illustrate circuit diagrams showing various exemplary active EMI filtering techniques. In particular, FIG. 2A illustrates a current sensing voltage injection EMI filter, FIG. 2B illustrates a current sensing current injection EMI filter, FIG. 2C illustrates a voltage sensing voltage injection EMI filter, and FIG. 2D illustrates a voltage sensing current injection EMI filter. The EMI filtering techniques shown in FIGS. 2A-2D can determine or sense common mode noise at a load side and use a high gain element (e.g., an operational amplifier) to introduce or inject a noise canceling signal at or near the noise source. Such active EMI filter techniques can reduce common mode noise by 10-20 db from 150 kHz to 1 MHz. In this manner, such EMI filtering techniques shown in FIGS. 2A-2D can attenuate EMI noise after the EMI noise reaches respective loads (which EMI noise is also detected at such loads) and attempts to introduce or inject noise canceling signals at or near a noise source.

For purposes of explanation and illustration, and not limitation, a circuit diagram of an exemplary embodiment of the feed forward active EMI filter in accordance with the invention is shown in FIG. 3 and is designated generally by reference character 315. As discussed above, FIG. 3 shows a circuit 300 including a noise source 305 connected to a load 310 and having active feed forward sensor 315 operatively coupled there-between. Active feed forward sensor 315 is indicated by a dashed box in FIG. 3 and includes an active feed forward circuit 320 as well as a filter capacitor 325 and an inductor 331. Active feed forward sensor 315 (via active feed forward circuit 320) detects current originating from noise source 305 and outputs a noise canceling signal (e.g., a voltage signal) to one side or terminal of capacitor 325 based on the sensed noise current. The noise canceling signal can, in part, be an inverted noise signal to cancel across filter capacitor 325, as discussed herein. For example, while the noise canceling signal is transmitted to one terminal of filter capacitor 325, the other terminal is connected to load 310 as well as to noise source 305 (via inductor 331). Filter capacitor 325 can therefore receive and absorb noise current from noise source 305 as well as receive and absorb the noise canceling signal from active feed forward sensor 320 reducing, eliminating, and/or attenuating the conducted EMI from noise source 305 to load 310.

Since, filter capacitor 325 absorbs the noise current from noise source 305 (which is the same as the noise current ($i_L$) through the inductor 320), and assuming capacitor 325 is an ideal capacitor, the voltage across the capacitor due to the noise current is represented as:

$$v_c = \frac{1}{C}\int i_L dt$$

In order to completely absorb the noise signal current at filter capacitor 325 to fully attenuate the noise level at load 310, an output voltage from filter capacitor 325 should be steady or zero. Therefore, the noise canceling signal received at one terminal of capacitor 325 (e.g., the output voltage from active feed forward sensor 320) should cancel the noise signal current or the voltage ripple across filter capacitor 325 received at its other terminal. For example, the noise canceling signal from active feed forward sensor 320 can be represented as:

$$v_a = -v_c = -\frac{1}{C}\int i_L dt$$

However, if capacitor 325 is a non-ideal capacitor, an equivalent series resistance (ESR) and equivalent series inductance (ESL) is also present. A complete representation of the voltage across a non-deal capacitor can be represented as:

$$v_c = \frac{1}{C}\int i_L dt + ESR * i_L + ESL\frac{di_L}{dt}$$

Accordingly, active feed forward sensor 320 should generate a complete noise canceling signal that accommodates the non-ideal ESR and ESL of capacitor 325. A resultant noise canceling circuit can thus be represented as:

$$v_a = -v_c = -\frac{1}{C}\int i_L dt - ESR * i_L - ESL\frac{di_L}{dt}$$

Referring now to FIGS. 4A-4B circuit diagrams of various embodiments of an active feed forward sensor in accordance with this disclosure are shown, particularly implementing an ideal filter capacitor and a non-ideal filter capacitor, respectively. In particular, referring to FIG. 4A, a circuit 400 is shown including an active feed forward sensor 415 having an active feed forward circuit 420, which can feed a noise canceling signal forward to filter capacitor 325 to attenuate noise signals, as described above. Operatively, active feed forward circuit 420 detects EMI noise from noise source 305 via noise detection circuit 330 and generates a noise canceling signal based on the received EMI noise. A power amplifier 405 receives the noise canceling signal from active feed forward circuit 420 and amplifies or increases the noise canceling signal. Power amplifier 405 transmits the amplified noise canceling signal to filter capacitor 325. Notably, power amplifier 405 can include various circuitry for amplification (e.g., diodes, resistors, operational amplifiers, transistors, and the like). Ultimately, filter capacitor 325 cancels the EMI noise received, at one terminal, from noise source 305 based on the noise canceling signal, which is received at a different terminal, thereby attenuating EMI noise and preventing or reducing such noise from reaching load 310. For example, when filter capacitor 325 value is C, the circuit parameter shown can be represented as:

$$r_1 C_1 = C$$

FIG. 4B illustrates a circuit 401 for the active feed forward sensor shown in FIG. 4A including a non-ideal filter capacitor implementation. In particular, FIG. 4B shows additional circuitry of active feed forward sensor 420 that can compensate for the ESR and ESL of a non-ideal filter capacitor, discussed above. When considering ESR and ESL, the additional circuitry can be used to completely compensate the non-ideal filter capacitor with the following parameters:

$$r_1 C_1 = C$$
$$\frac{r_2}{r_1} = ESR$$
$$C_2 r_3 = ESL$$

One can also choose the right parameters or use part of the active circuit to cancel only ESR or ESL.

Notably, in some embodiments, the circuitry for compensating for the additional ESR and ESL can be implemented outside of active feed forward circuit 320. Those skilled in the art will appreciate that the circuit diagrams shown herein are for examples and other substitute configurations can be used without departing from the spirit and scope of the invention, as appreciated by those skilled in the art.

With respect now to FIG. 5A, an implementation of the active feed forward sensor is shown in accordance with a three phase noise source. As discussed above, EMI noise typically ranges from approximately 150 kHz to approximately 30 MHz. Typically, the switching frequency and lower harmonic components account for a substantial amount of voltage and current of the active feed forward sensor. Accordingly, one or more of low pass filters and/or notch filters can be used to reduce the overall voltage and current rating of the active feed forward sensor by eliminating noise component signals outside of the EMI noise band. For example, FIG. 5A shows an example circuit 500 that implements such additional filters for a three-phase noise source 505. Notably, small size passive filters (shown as three capacitors located between inductors 531 and filter capacitors 525) can be implemented to attenuate high frequency EMI noise, which is beyond the active filter frequency band.

In operation, active feed forward sensor 515, similar to active feed forward sensor 315, includes a noise detection circuit 530, an active feed forward circuit 520 and a filter capacitor 525. Active feed forward sensor 515 is disposed between a noise source (i.e., noise source 505) and a load (i.e., load 510). Additionally, as discussed above, one or more filters such as a high pass filter 535 and notch filter 540 receive the detected EMI noise signal from detection circuit 530 and filter out noise signals outside of the EMI noise signal band. Once filtered, the EMI noise signal can be passed to active feed forward circuit 520. Active feed forward circuit 520, like active feed forward circuit 320, receives the EMI noise signal and, based on the received EMI noise signal, generates a noise canceling signal. The noise canceling signal is passed onto one or more filter capacitors 525 to cancel the EMI noise prior to load 510. A power amplifier 506, like power amplifier 405 discussed above, amplifies the noise canceling signal before it reaches the filter capacitors 525.

Figure 5B:
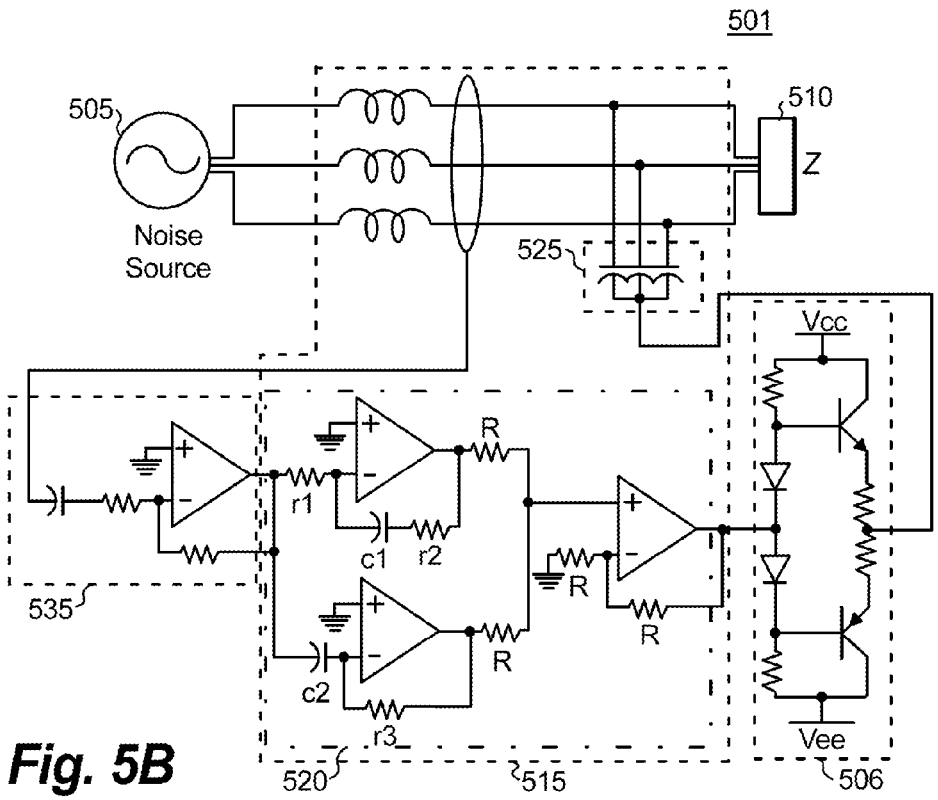

Referring now to FIG. 5B, there is shown a circuit diagram 501 of another exemplary implementation of the active feed forward sensor shown in FIG. 5A. Circuit 501 includes particular circuit components for high pass filter 535 and power amplifier 506 (i.e., a totem pole stage amplifier). Further, as shown, active feed forward circuit 520, like active feed forward circuit of FIG. 4B, can account for additional ESR and ESL of a non-ideal filter capacitor (i.e., filter capacitor(s) 525). The active feed forward circuit 520 accounts for the additional non-ideal ESR and ESL via operational amplifiers coupled to respective resistors, capacitors, etc., as discussed above. Circuit 501 does not include circuitry for notch filter 540; however, a notch filter can be operatively included as described above.

Figure 6A:
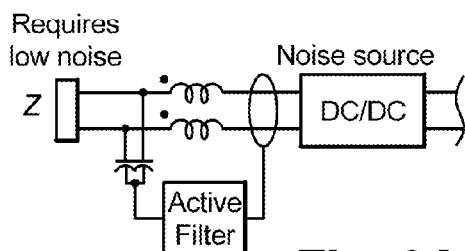
FIGS. 6A-6D are circuit diagrams of various applications of the active feed forward sensor in accordance with a variety of noisy systems.
Figure 6B:
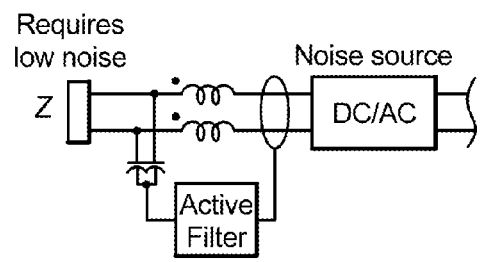
Figure 6C:
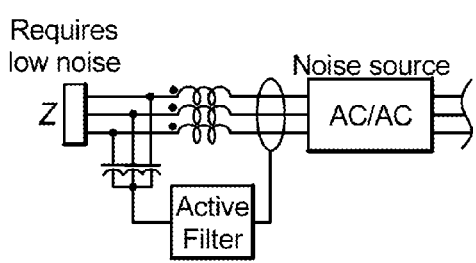
Figure 6D:
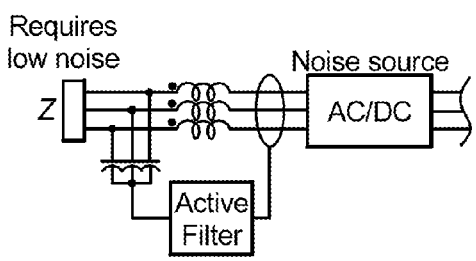

With reference now to FIGS. 6A-6D, collectively, various applications of an active feed forward sensor in accordance with a variety of noisy systems are shown. In particular, FIG. 6A shows the active feed forward sensor implementation for a DC/DC noise source, FIG. 6B shows the active feed forward sensor implementation for a DC/AC noise source, FIG. 6C shows the active feed forward sensor implementation for an AC/AC noise source, and FIG. 6D shows the active feed forward sensor implementation for an AC/DC noise source.

The methods and systems of the present invention, as described above and shown in the drawings, provide for EMI noise attenuation and filtering with superior properties including active feed forward sensors that detect EMI noise from a noise sources and attenuate such noise via noise canceling signals and filtering capacitors thereby reducing or eliminating such EMI noise reaching loads. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An apparatus for active feed forward electromagnetic interference (EMI) filtering, comprising:
    a noise detection circuit for receiving EMI noise occurring at a noise source;
    an active feed forward circuit operatively coupled to the noise detection circuit to generate a noise canceling signal based on EMI noise received by the noise detection circuit; and
    a filter operatively coupled to the active feed forward circuit and the noise source adapted to receive the EMI noise occurring at the noise source and the noise canceling signal from the active feed forward circuit, wherein the filter cancels received EMI noise based on received noise canceling signal to reduce EMI noise at a load.

2. An apparatus as recited in claim 1, wherein the filter includes a capacitor configured and adapted to receive the EMI noise occurring at the noise source at a first terminal, and to receive the noise canceling signal from the active feed forward circuit at a second terminal opposed to the first terminal, wherein the capacitor is configured and adapted to maintain a substantially steady voltage to attenuate the received EMI noise received at the first terminal based on the received noise canceling signal at the second terminal.

3. An apparatus as recited in claim 2, wherein the filter further includes an inductor operatively coupled in series between the noise source and the load, wherein the capacitor is operatively coupled in parallel to the noise source and the load and in series with the active feed forward circuit.

4. An apparatus as recited in claim 2, wherein the filter further includes at least one high pass filter and at least one notch filter to prevent the filter from substantially receiving additional signal noise outside an EMI noise frequency from the noise source.

5. An apparatus as recited in claim 4, wherein the filter is configured and adapted to substantially eliminate EMI band of noise substantially above about 150 kHz.

6. An apparatus as recited in claim 1, further comprising:
an amplifier operatively coupled between the active feed forward circuit and the filter to increase the noise canceling signal generated by the active feed forward sensor to yield an amplified noise canceling signal, wherein the noise canceling signal received at the filter is the amplified noise canceling signal.

7. An apparatus as recited in claim 6, wherein the amplifier includes one or more operational amplifiers.

8. A method for active electromagnetic interference (EMI) filtering, comprising:
determining, via a noise detection circuit, EMI noise occurring at a noise source;
generating, via an active feed forward sensor operatively coupled to the noise detection circuit, a noise canceling signal based on the determined EMI noise by the noise detection circuit;
receiving, via a filter operatively coupled to the active feed forward sensor and the noise source, the EMI noise occurring at the noise source and the noise canceling signal from active feed forward sensor; and
canceling, via the filter, the received EMI noise based on the received noise canceling signal to reduce EMI noise at a load.

9. A method as recited in claim 8, wherein the canceling, via the filter, the received EMI noise based on the received noise canceling signal comprises:
receiving the EMI noise occurring at the noise source at a first terminal of a filter capacitor;
receiving the noise canceling signal at a second terminal opposed to the first terminal of the filter capacitor; and
maintaining a substantially steady voltage at the filter capacitor to attenuate the received EMI noise received at the first terminal based on the received noise canceling signal at the second terminal.

10. A method as recited in claim 9, further comprising:
filtering low frequency noise outside an EMI noise frequency, via at least one high pass filter, prior to canceling the received EMI noise.

11. A method as recited in claim 8, further comprising:
amplifying, the noise canceling signal to yield an amplified noise canceling signal,
wherein receiving the noise canceling signal includes receiving the amplified noise canceling signal, and
wherein canceling the received EMI noise based on the received noise canceling signal includes canceling the received EMI noise based on the received amplified noise canceling signal.

* * * * *